United States Patent
Schmidt et al.

(10) Patent No.: US 9,282,755 B2
(45) Date of Patent: Mar. 15, 2016

(54) HEAT STABLE CONCENTRATED DAIRY LIQUID AND CREAM PRODUCT

(75) Inventors: Gavin Matthew Schmidt, Hoffman Estates, IL (US); Jennifer Louise Kimmel, Evanston, IL (US); Aaron S. Handrick, Chicago, IL (US); Lisa Ann Dierbach, Hoffman Estates, IL (US); Kenneth Allen Mikeska, Gurnee, IL (US); Bruce Edward Campbell, Glenview, IL (US); Karen Robinson, Glenview, IL (US)

(73) Assignee: Intercontinental Great Brands LLC, East Hanover, NJ (US)

(*) Notice: Subject to any disclaimer, the term of this patent is extended or adjusted under 35 U.S.C. 154(b) by 2043 days.

(21) Appl. No.: 12/203,051

(22) Filed: Sep. 2, 2008

(65) Prior Publication Data
US 2010/0055290 A1 Mar. 4, 2010

(51) Int. Cl.
*A23C 9/142* (2006.01)
*A23C 3/03* (2006.01)
*A23C 9/15* (2006.01)
*A23C 9/152* (2006.01)

(52) U.S. Cl.
CPC ............... *A23C 9/1422* (2013.01); *A23C 3/03* (2013.01); *A23C 9/1508* (2013.01); *A23C 9/1522* (2013.01)

(58) Field of Classification Search
CPC .................................................... A23C 9/1422
See application file for complete search history.

(56) References Cited

U.S. PATENT DOCUMENTS

| | | | |
|---|---|---|---|
| 2,334,317 A | 11/1943 | Crighton | |
| 2,860,053 A | 11/1958 | Fitzhugh | |
| 2,860,057 A | 11/1958 | Wilcox | |
| 3,210,201 A | 10/1965 | Tumerman et al. | |
| 3,348,955 A | 10/1967 | Stewart, Jr. | |
| 4,282,262 A | 8/1981 | Blake | |
| 4,529,611 A | 7/1985 | Uiterwaal | |
| 5,356,640 A | 10/1994 | Jameson et al. | |
| 5,503,865 A | 4/1996 | Behringer et al. | |
| 5,766,666 A | 6/1998 | Streiff et al. | |
| 5,902,625 A * | 5/1999 | Barz et al. ............. | 426/582 |

(Continued)

FOREIGN PATENT DOCUMENTS

| | | |
|---|---|---|
| CH | 486 208 A | 2/1970 |
| CN | 101026963 A | 8/2007 |

(Continued)

OTHER PUBLICATIONS

Gebhardt and Thomas. "Nutritive Value of Foods"—USDA Agricultural Research Service, Home and Garden Bulletin No. 72. Oct. 2002. pp. 18-20.*

(Continued)

*Primary Examiner* — Jenna A Watts
(74) *Attorney, Agent, or Firm* — Fitch, Even, Tabin & Flannery LLP (57) ABSTRACT

Disclosed are stable concentrated dairy liquids exhibiting enhanced fresh dairy flavor notes and methods of making thereof. The resultant concentrated products herein include a reduced dairy protein level and increased fat content through a cream addition. By one approach, the concentrated dairy liquids have a protein to fat ratio of about 0.4 to about 0.7 achieved through the selection of the starting dairy base and a selected cream addition. Preferably, the cream addition occurs at specific input locations in the process in order to achieve stable concentrates.

27 Claims, 3 Drawing Sheets

(56) References Cited

U.S. PATENT DOCUMENTS

| | | | |
|---|---|---|---|
| 6,060,105 | A | 5/2000 | Meister et al. |
| 6,139,901 | A | 10/2000 | Blazey et al. |
| 6,887,505 | B2 | 5/2005 | Reaves et al. |
| 6,921,548 | B2 | 7/2005 | McCampbell |
| 7,285,301 | B2 | 10/2007 | McCampbell |
| 2001/0026825 | A1 | 10/2001 | Reaves et al. |
| 2003/0054068 | A1 | 3/2003 | Dybing et al. |
| 2003/0054079 | A1 | 3/2003 | Reaves et al. |
| 2004/0067296 | A1 | 4/2004 | Loh |
| 2004/0251202 | A1 | 12/2004 | Yen et al. |
| 2005/0181092 | A1 | 8/2005 | Achs |
| 2006/0040025 | A1 | 2/2006 | Souppe |
| 2006/0073256 | A1 | 4/2006 | Destaillats et al. |
| 2007/0172548 | A1 | 7/2007 | Cale et al. |

FOREIGN PATENT DOCUMENTS

| | | | |
|---|---|---|---|
| DE | 2 413 193 | A1 | 10/1974 |
| EP | 0 316 938 | A2 | 5/1989 |
| EP | 0 542 583 | A1 | 5/1993 |
| EP | 0 788 313 | A1 | 8/1997 |
| EP | 1 407 673 | A1 | 4/2004 |
| EP | 0 542 583 | B2 | 10/2005 |
| EP | 1618790 | A1 | 1/2006 |
| EP | 1 389 914 | B1 | 9/2006 |
| GB | 1 438 533 | A | 6/1976 |
| JP | 10-056962 | A | 3/1998 |
| JP | 10-113122 | A | 5/1998 |
| JP | 2000-102344 | A | 4/2000 |
| JP | 2002-000291 | A | 1/2002 |
| JP | 2002345402 | A | 12/2002 |
| JP | 2003199492 | A | 7/2003 |
| JP | 2004-510445 | A | 4/2004 |
| JP | 2005-185151 | A | 7/2005 |
| JP | 2005-245281 | A | 9/2005 |
| JP | 2006087358 | A | 4/2006 |
| JP | 2008029278 | A | 2/2008 |
| UA | 77675 | C2 | 2/2004 |
| WO | 87/06797 | A1 | 11/1987 |
| WO | 02/30210 | A1 | 4/2002 |
| WO | 03/090545 | A1 | 11/2003 |
| WO | 2006/012506 | A1 | 2/2006 |
| WO | 2008002492 | A2 | 1/2008 |
| WO | 2008/077071 | A1 | 6/2008 |
| WO | 2008/136671 | A1 | 11/2008 |

OTHER PUBLICATIONS

European Patent Office Extended European Search Report for European Application No. 09167573.6 dated May 3, 2011 (14 pages).
Fundamentals of Dairy Chemistry, 3rd Ed., Chapter 2, Composition of Milk Products, p. 43, undated.
H. K. Wilson and E. O Herreid, Controlling oxidized flavours in high-fat sterilized creams, Journal of Dairy Science, 1969, 52 (8),1229-32, Abstract from DIALOG(R) File 51: Food Sci. & Tech. Abs, 1 page.
D. M. Santos et al., Sandiness and other problems in doce de leite, Boletim do Instituto de Tecnologia de Alimentos, 1977, (52), 61-80, Abstract from DIALOG(R) File 50: CAB Abstracts, 1 page.
V. R. Harwalkar and H. J. Vreeman, Effect of added phosphates and storage on changes in ultra-high temperature short-time sterilized concentrated skim-milk. 1. Viscosity, gelation, alcohol stability, chemical and electrophoretic analysis of proteins, Netherlands Milk and Dairy Journal, 32 (1978), pp. 94-111.
A. W. Sweetsur and D. D. Muir, The use of permitted additives and heat treatment to optimise the heat stability of skimmed milk and concentrated skim milk, Journal of the Society of Dairy Technology, 1980, 33 (3), 101-5, Abstract from DIALOG(R) File 53: FOODLINE(R): Science, 1 page.
A. W. Maurice Sweetsur and D. Donald Muir, Effect of concentration by ultrafiltration on the heat stability of skim-milk, Journal of Dairy Research, 47, No. 3 (1980), pp. 327-335.
A. W. M. Sweetsur and D. D. Muir, Natural variation in heat stability of concentrated milk before and after homogenization, Journal of the Society of Dairy Techhnology, 1982, vol. 35 (4), 120-126, Abstract from DIALOG(R) File 50: CAB Abstracts, 1 page.
A. W. M. Sweetsur and D. D. Muir, Manipulation of the heat stability of homogenised concentrated milk, Journal of the Society of Dairy Technology, 1982, vol. 35 (4), 126-32, Abstract from DIALOG(R) File 53: FOODLINE(R): Science, 1 page.
E. R. B. Graham, The effect of different factors on the viscosity of concentrated milk, XXI International Dairy Congress, 1982, vol. 1, Book 2, p. 45, Abstract from DIALOG(R) File 50: CAB Abstracts, 1 page.
D. D. Muir, The influence of some inorganic salts on the heat stability of 40% solids concentrated skim milk, XXI International Dairy Concgress, 1982, vol. 1, Book 2, p. 86, Abstract from DIALOG(R) File 50: CAB Abstracts, 1 page.
A. W. M. Sweetsur and D. D. Muir, Optimization of the heat stability of concentrated milks prepared by ultrafiltration, Milchwissenschaft, 40 (6), 1985, pp. 334-337.
J. S. Sindhu, Influence of sodium phosphate on the heat stability of buffalo milk and its concentrate, Journal of Food Processing and Preservation, 1985, 9 (2), 57-64, Abstract from DIALOG(R) File 51: Food Sci. & Tech. Abs, 1 page.
J. A. Blais et al., Concentrated milks and milk powder, Presses de L'Universite Laval, 1985, 280-314, Abstract from DIALOG(R) File 53: FOODLINE(R): Science, 1 page.
J. S. Sindhu and M. Tayal, Influence of stabilizers on the salt balance of pH of buffalo milk and its concentrate, Journal of Food Technology, 1986, 21 (3), 331-7, Abstract from DIALOG(R) File 53: FOODLINE(R): Science, 1 page.
J. A. Nieuwenhuijse et al., Calcium and phosphate partitions during the manufacture of sterilized concentrated milk and their relations to the heat stability, Netherlands Milk and Dairy Journal, 1988, 42 (4), 387-421, Abstract from DIALOG(R) File 51: Food Sci. & Tech. Abs, 1 page.
Donald J. McMahon et al., Effects of phosphate and citrate on the gelation properties of casein micelles in renneted ultra-high temperature (UHT) sterilized concentrated milk, Food Structure, vol. 10 (1991), pp. 27-36.
N. Venkatachalam and Donald J. McMahon, Effect of lactose concentration on age gelation of UHT sterilized skim milk concentrate, 86 Annual Meeting of American Dairy Science Association, Aug. 12-15, 1991, Champaign, Illinois, Abstract from Journal of Dairy Science 309, p. 101.
J. A. Nieuwenhuijse, Heat stability of concentrated skim milk, Netherlands Milk and Dairy Journal, 1993, 47 (1), 51-53, Abstract from DIALOG(R) File 53: FOODLINE(R): Science, 1 page.
Mohamed Zin El-Din and Takayoshi Aoki, Polymerization of Casein on Heating Milk, Int. Dairy Journal 3 (1993) 581-588.
J. E. Schraml et al., Effects of composition and concentration of dairy liquids on fouling structure, Milchwissenschaft, 1996, 51 (11), 607-611, Abstract from DIALOG(R) File 53: FOODLINE(R): Science, 1 page.
J. Hinrichs et al., Ultrahocherhitzen von Milchkonzentraten, Deutsche Milchwirtschaft, 48 (1997) pp. 185-188.
M. E. Cano-Ruiz and R. L. Richter, Changes in Physiochemical Properties of Retort-Sterilized Dairy Beverages During Storage, Journal of Dairy Science, 81 (1998) pp. 2116-2123.
Jay, High-Temperature Food Preservation and Characteristics of Thermophilic Microorganisms, Modern Food Microbiology, Chapter 16, 1998, Aspen Publishers, NY, pp. 347-369.
DeMAN, Principles of Food Chemistry, 3rd Ed., 1999, p. 272.
E. Mann, Recombined milk, Dairy Industries International, Feb. 2001, 66 (2), 15-16, Abstract from DIALOG(R) File 53: FOODLINE(R): Science, 1 page.
P. Udabage et al., Effects of Mineral Salts and Calcium Chelating Agents on the Gelation of Renneted Skim Milk, Journal of Dairy Science, 84 (2001), pp. 1569-1575.
N. Datta and H. C. Deeth, Age Gelation of UHT Milk—A Review, Trans IChemE, vol. 79, Part C, Dec. 2001, pp. 197-210.

(56) References Cited

OTHER PUBLICATIONS

R. Mizuno and J. A. Lucey, Effects of emulsifying salts on the turbidity and calcium-phosphate-protein interactions in casein micelles, Journal of Dairy Science, Sep. 2005, 88 (9) 3070-3078, Abstract from DIALOG(R) File 53: FOODLINE(R): Science, 1 page.

J. Hinrichs et al., Ultrahocherhitzen von Milchkonzentraten, Deutsche Milchwirtschaft, 48 (1997) pp. 185-188, Google Machine English Translation of Summary.

Athina Tziboula et al., Microfiltration of milk with ceramic membranes: Influence on casein composition and heat stability, Milchwissenschaft, 53 (1) 1998 pp. 8-11.

G. Solanki and S. S. H. Rizvi, "Physico-Chemical Properties of Skim Milk Retentates from Microfiltration," Journal of Dairy Science, vol. 84, No. 11, Nov. 2001, pp. 2381-2391.

B. K. Nelson and D. M. Barbano, "A Microfiltration Process to Maximize Removal of Serum Proteins from Skim Milk Before Cheese Making," Journal of Dairy Science, vol. 88, No. 5, May 2005, pp. 1891-1900.

\* cited by examiner

HEAT STABLE CONCENTRATED DAIRY LIQUID AND CREAM PRODUCT

FIELD

The field relates to concentrated dairy products, and more specifically, to non-gelling, non-browning, organoleptically pleasing, concentrated dairy products, such as concentrated milks, and methods for producing the same.

BACKGROUND

Liquid dairy products, such as milk, are generally thermally processed to increase their stability and to render them microbiologically safe. Unfortunately, thermally treating of milk can result in color changes, gelation, and the formation of off-flavor notes in some instances. For example, lactose in milk heated to high temperatures can interact with proteins and result in an unsightly brown color. This undesired condition is often referred to as browning or a browning or a Mallaird reaction. Gelation, on the other hand, is not completely understood, but the literature suggests that gels may form, under certain conditions, as a three-dimensional protein matrix formed by the whey proteins. See, e.g., Datta et al., "Age Gelation of UHT Milk—A Review," Trans. IChemE, Vol. 79, Part C, 197-210 (2001). Both gelation and browning are generally undesirable in milk since they impart objectionable organoleptic properties.

The concentration of milk is often desired because it allows for smaller quantities to be stored and transported, thereby resulting in decreased storage and shipping costs, and may allow for the packaging and use of milk in more efficient ways. However, the production of an organoleptically-pleasing, highly concentrated milk can be difficult, because the concentration of milk generates even more pronounced problems with gelation, browning, and also the formation of compounds imparting undesired flavor and off-notes. For instance, milk that has been concentrated at least three fold (3×) has an even greater tendency to undergo protein gelation and browning during its thermal processing. Additionally, due to such high levels of protein in the concentrated milk, it may also have a greater tendency to separate and form gels over time as the product ages, thereby limiting the usable shelf life of the product.

A typical method of producing concentrated milk involves multiple heating steps in combination with the concentration of the milk. For example, one general method used to produce concentrated milk involves first standardizing the milk to a desired ratio of solids to fat and then forewarming the milk to reduce the risk of the milk casein from coagulating during later sterilization. Forewarming also decreases the risk of coagulation taking place during storage prior to sterilization and may further decrease the initial microbial load. The forewarmed milk is then concentrated to the desired concentration. The milk may be homogenized, cooled, restandardized, and packaged. In addition, a stabilizer salt may be added to help reduce the risk of coagulation of the milk that may occur at high temperatures or during storage. Either before or after packaging, the product is sterilized. Sterilization usually involves either relatively low temperatures for relatively long periods of time (for example, about 90° C. to about 120° C. for about 5 to about 30 minutes) or relatively high temperatures for relatively short periods of time (for example, about 135° C. or higher for a few seconds). Processes to concentrate milk generally report shelf stability ranging from about 1 month to greater than about 6 months.

Various prior approaches for the production of concentrated milk have been documented that report the formation of dairy concentrates having varying levels of stability. For example, U.S. Patent Publication Number 2003/0054079 A1 (Mar. 20, 2003) to Reaves discloses a method of producing an ultra-high temperature milk concentrate generally having 30 to 45 percent nonfat milk solids. That is, Reaves discloses a milk concentrate generally having 11 to 17 percent protein and 16 to 24 percent lactose (assuming nonfat milk solids are about 37 percent protein and about 54 percent lactose). Reaves notes that such nonfat dairy solid levels are critical to the process and that lower nonfat milk solids will not produce acceptable results. Reaves reports shelf lives of 30 days to 6 months for the resulting milk concentrate. With such high lactose levels, it is expected that the concentrated milks of Reaves will undergo browning or Mallaird reactions during sterilization resulting in an undesired brownish color.

Reaves also discloses the preheating of milk for 10 minutes at 65° C. (150° F.) to produce a preheated, milk starting product. The milk starting product is then pasteurized at 82° C. (180° F.) for 16 to 22 seconds and evaporated under elevated pasteurizing temperatures (i.e., 10 minutes at 62° C. (145° F.) under vacuum) to produce an intermediate, condensed liquid milk. The evaporation process used by Reaves will result in a condensed milk having the same relative amounts of protein and lactose as in the starting milk source. A cream and stabilizer, such as sodium hexametaphosphate or carrageenan, are then added to the intermediate milk, which is then ultrapasteurized in two stages wherein the first stage is at 82° C. (180° F.) for 30 to 36 seconds and second stage is at 143° C. (290° F.) for 4 seconds. The ultrapasteurized beverage is then homogenized after the pasteurization and packaged to form the ultrapasteurized liquid milk concentrate.

U.S. Patent Publication Number 2007/0172548 A1 (Jul. 26, 2007) to Cale discloses a process of producing a concentrated milk with high levels of dairy proteins and low levels of lactose. The process of Cale discloses thermal treatments combined with the ultrafiltration of a liquid dairy base to produce a concentrated dairy product having greater than about 9 percent protein (generally about 9 to about 15 percent protein), about 0.3 to about 17 percent fat (generally about 8 to about 8.5 percent fat), and less than about 1 percent lactose.

The process of Cale, however, discloses that all the protein and fat in the final concentrated beverage are supplied directly from the starting liquid dairy base and, therefore, the amounts in the final beverage are also constrained by the composition of the starting dairy base and the particular concentration process employed. In other words, if higher amounts protein or fat are desired in a final beverage obtained from Cale's process, then the other of the protein or fat is also increased by a corresponding amount because each component is only supplied from the same starting dairy base and, therefore, subjected to the same concentration steps. The process of Cale, therefore, will generally not permit a concentrated dairy beverage having increases in one of protein or fat and, at the same time, decreases in the other of protein or fat.

SUMMARY

Disclosed are stable concentrated dairy liquids exhibiting enhanced fresh dairy notes and methods of making thereof. In order to achieve the enhanced fresh dairy notes, one aspect of the disclosed methods and products herein provides a formulation having a reduced dairy protein level and an increased fat content obtained through a specific blend of a cream-enriched and concentrated liquid dairy base. By one approach, the stable concentrated dairy liquid has a protein to fat ratio of about 0.4 to about 0.7. In another aspect, the cream enrichment occurs at selected input locations during the concentration and thermal process in order to form a fluid and stable concentrate. The resultant concentrates exhibit a stability for at least about 9 months as evidenced by a brew recovery of at least about 90 percent, and the resultant concentrates also have reduced sulfur and/or nitrogen aroma intensities. Varying the location, amounts, and/or form of the cream addition generally results in gelled or separated concentrates after sterilization.

While various approaches for concentrating milk have been documented, the relatively severe thermal treatments needed to sufficiently sterilize the concentrated products produced from the prior methods can result in flavor profiles that are different than a fresh dairy product. While not wishing to be limited by theory, it is believed that the thermal sterilization process may result in a degradation of at least some of the dairy proteins into trace amounts of compounds that can be linked to flavor profiles that are perceived by some as being different from a fresh dairy product. It is also believed that these trace compounds, which may be formed from the breakdown of dairy proteins due to the thermal processing, may include sulfur and/or nitrogen containing volatile compounds that could be responsible for the differences in the aromas and/or flavor profiles of concentrated milk products as compared to fresh milk beverages. As a result, even if prior concentration and sterilization methods result in a heat and shelf-stable product, the sterilizing process often results in the formation of flavor profiles, in some instances, different than fresh milk beverages.

In this case, the formulation and processing methods disclosed herein achieve a stable and fluid dairy concentrate having enhanced fresh dairy notes through concentration to effective protein and fat levels to reduce and, preferably, eliminate off-notes due to sterilization, and through enhancement via selective cream enrichment to achieve the flavor notes of fresh dairy products within a stable product. By adding the cream at selective process locations to increase the fat content, the resultant concentrated beverage has both a composition that remains fluid and, simultaneously, effective to exhibit a mouth feel and/or mouth coating, when reconstituted, similar to fresh dairy products. At the same time, by reducing the level of dairy proteins, the resultant concentrated dairy liquids also generally have less protein degradation due to sterilization and, therefore, less sulfur and/or nitrogen containing compounds that can impart off-notes to the beverage. To this end, the concentrated dairy liquids herein generally have reduced sulfur and/or nitrogen aroma intensity values due to the reduction of sulfur and/or nitrogen containing volatile compounds. For example, the resultant concentrated dairy beverages have about 20 to about 45 percent less sulfur and/or nitrogen containing volatiles than prior concentrated dairy beverages.

In other features, the methods of forming a stable concentrated dairy liquid first forewarm a liquid dairy base at a temperature of at least about 60° C. Next, the forewarmed liquid dairy base is concentrated using ultrafiltration, with or without diafiltration, to form a concentrated dairy liquid retentate. An amount of cream is then blended into the concentrated dairy liquid retentate to form a cream enriched concentrated dairy liquid. By one approach, the cream enriched concentrated dairy liquid has less than about 11 percent protein (preferably, about 9 to about 11 percent protein), greater than about 15 percent fat, and less than about 1.5 percent lactose with a total solids between about 25 and about 30 percent.

The cream enriched concentrated dairy liquid is then homogenized to form a homogenized cream enriched dairy liquid. Preferably, the cream is not pre-homogenized by itself, but blended with the retentate and then homogenized as a single blended material. In addition, if the cream enrichment occurs at other process locations, such as before concentration, before forewarming, or after homogenization, then the resultant dairy liquid is generally not stable and may gel or separate upon sterilization or after an extended shelf life.

Next, an effective amount of a stabilizer may be added to the homogenized cream enriched dairy liquid to form a stabilized cream enriched dairy liquid that remains a stable homogeneous fluid after sterilization. By one approach, about 0.2 to about 0.6 percent stabilizer is added to the homogenized cream enriched dairy liquid. Preferably, the stabilizer includes about 50 to about 25 percent disodium phosphate and about 50 to about 75 percent monosodium phosphate where a ratio of monosodium phosphate to disodium phosphate is between about 1:1 to about 3:1. With the reduced protein levels, a ratio of protein to total stabilizer is between about 10:1 to about 38:1, ratios above and below these ranges tend to result in gelled or separated concentrates (i.e., bimodal). The stabilized cream enriched dairy liquid is then sterilized at a temperature and for a time sufficient to obtain the stable concentrated dairy liquid having a $F_o$ value of at least about 5.

In another aspect, the resultant stable concentrated dairy liquid having the cream enrichment generally has about 15 percent or less fat (preferably, about 9 to about 15 percent fat), about 10 or less percent protein (preferably, about 5 to about 10 percent protein), and less than about 1 percent lactose. Preferably, the stable concentrated dairy liquid may have a protein to fat ratio of about 0.4 to about 0.7 and, most preferably, about 0.6. The fat is supplied from both the ultrafiltered dairy liquid (via the liquid dairy base) and the cream. In some forms, the stable concentrated dairy liquid may have up to about 2.5 times fat as protein. With such formulation and by using the process steps described above, the stabilized cream enriched dairy liquid is resistant to gelation during sterilization, and the resultant stable concentrated dairy liquid (after sterilization) is resistant to gelation and remains a visually stable fluid emulsion for at least about 9 months under ambient storage conditions. After sterilization, there is generally less sulfur and/or nitrogen containing volatiles in the final beverage due to protein degradation. Through the protein to fat ratios discussed above and through the addition of cream at specified process locations, the stable concentrated dairy liquid, when reconstituted, provides an enhanced fresh dairy flavor.

DETAILED DESCRIPTION OF THE PREFERRED EMBODIMENT

The methods and products disclosed herein relate to stable concentrated dairy liquids having enhanced fresh dairy notes that remain stable for an extended shelf life at ambient conditions. In one aspect, the stable concentrated dairy liquid has about 10 or less percent total protein and about 15 percent or less fat and may have a protein to fat ratio of about 0.4 to about 0.7. The fat is supplied from the combination of a starting liquid dairy base and through the addition of cream. In another aspect, the cream addition occurs at specified processing points during the concentration and thermal treatment process in order to form concentrated dairy liquids that remains stable during thermal processing and through an extended shelf life. The cream addition, in one approach, occurs after concentration of the starting liquid dairy base, before homogenization, and before any other ingredients are added back into the process. It has been discovered that varying the location, amounts, or form of cream addition generally results in concentrates that may gel or separate after sterilization or after an extended shelf life.

In other aspects, the resultant stable concentrated dairy liquids herein have reduced levels of protein and increased amounts of fat via the cream addition as compared to prior fluid dairy concentrates. Generally due to the low protein and high fat, the disclosed concentrated dairy liquids exhibit enhanced fresh dairy flavor profiles with substantially no off-notes or flavors even after sterilization heat treatments. The dairy liquids herein are also generally resistant to gelation and browning during sterilization, and resistant to gelation and browning for at least about 9 months of storage under ambient conditions. In particular, the concentrated dairy liquids made by the disclosed processes exhibit such stability and fresh dairy flavors even when exposed to thermal processing sufficient to achieve a sterilization value ($F_o$) of at least about 5 minutes as required for commercial sterility and nominally up to about 13.5 minutes. Even after being exposed to such sterilization, the stable concentrated dairy liquids generally have minimal protein degradation, which results in reduced aroma intensity levels due to sulfur and nitrogen containing volatiles. For example, the stable concentrated dairy liquids generally have a reduction of about 20 to about 45 percent in sulfur and nitrogen containing volatiles as compared to prior concentrates based on a GC/O analysis (gas chromatography-olfactometry).

In general, the stable and organoleptically-pleasing dairy liquid is formed through a multi-step thermal and concentration process to achieve a desired sterilization value, product stability characteristics, and fresh dairy flavor notes by decreasing the protein content, increasing the fat content, and reducing the presence of any sulfur or nitrogen containing volatile compounds in the final beverage. For instance, the method comprises forewarming, concentrating using ultrafiltration with or without diafiltration, blending cream prior to homogenization, adding stabilizers and other ingredients after homogenization, and sterilizing to provide an overall thermal treatment that produces the stable concentrated dairy liquid having a $F_o$ of at least about 5, preferably at least about 6.5, and more preferably at least about 7.5 with the reduced presence of sulfur and nitrogen containing volatiles at the same time.

The degree of sterilization or the sterilization value ($F_o$) is based on the time that the dairy product is subjected to specific temperatures and is a culmination of all thermal treatments that the product encounters during processing. Consequently, a desired sterilization value may be achieved through a variety of processing conditions. Typically, concentrated milk is sterilized to a $F_o$ of at least about 5 and preferably to a much higher level (e.g., about 13 or higher).

The sterilization value for a sterilization process can be measured using graphical integration of time-temperature data during the food's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L=10^{(T-121)/z}$$

Where:
T=arithmetic mean temperature for a small time increment in ° C.;
z=standardized value for the particular microorganism; and
L=lethality of a particular micro-organism at temperature T.

Next, the lethality value calculated above for each small time increment is multiplied by the time increment and then summed to obtain the sterilization value ($F_o$) using the formula:

$$F_o=(t_{T1})(L_1)+(t_{T2})(L_2)+(t_{T3})(L_3)+\ldots$$

Where:
$t_{T1}, t_{T2}, \ldots$ =Time increment at temperature T1, T2, . . . ;
$L_1, L_2, \ldots$ =Lethality value for time increment 1, time increment 2, . . . ; and
$F_o$=Sterilization value at 121° C. of a microorganism.

Consequently, once a penetration curve is generated, the sterilization value $F_o$ for the process can by computed by converting the length of process time at any temperature to an equivalent process time at a reference temperature of 121° C. (250° F.). The calculation of the sterilization value is generally described in Jay, 1998, "High Temperature Food Preservation and Characteristics of Thermophilic Microorganisms," in Modern Food Microbiology (D. R. Heldman, ed.), ch. 16, New York, Aspen Publishers, which is incorporated herein in its entirety.

Figure 1:
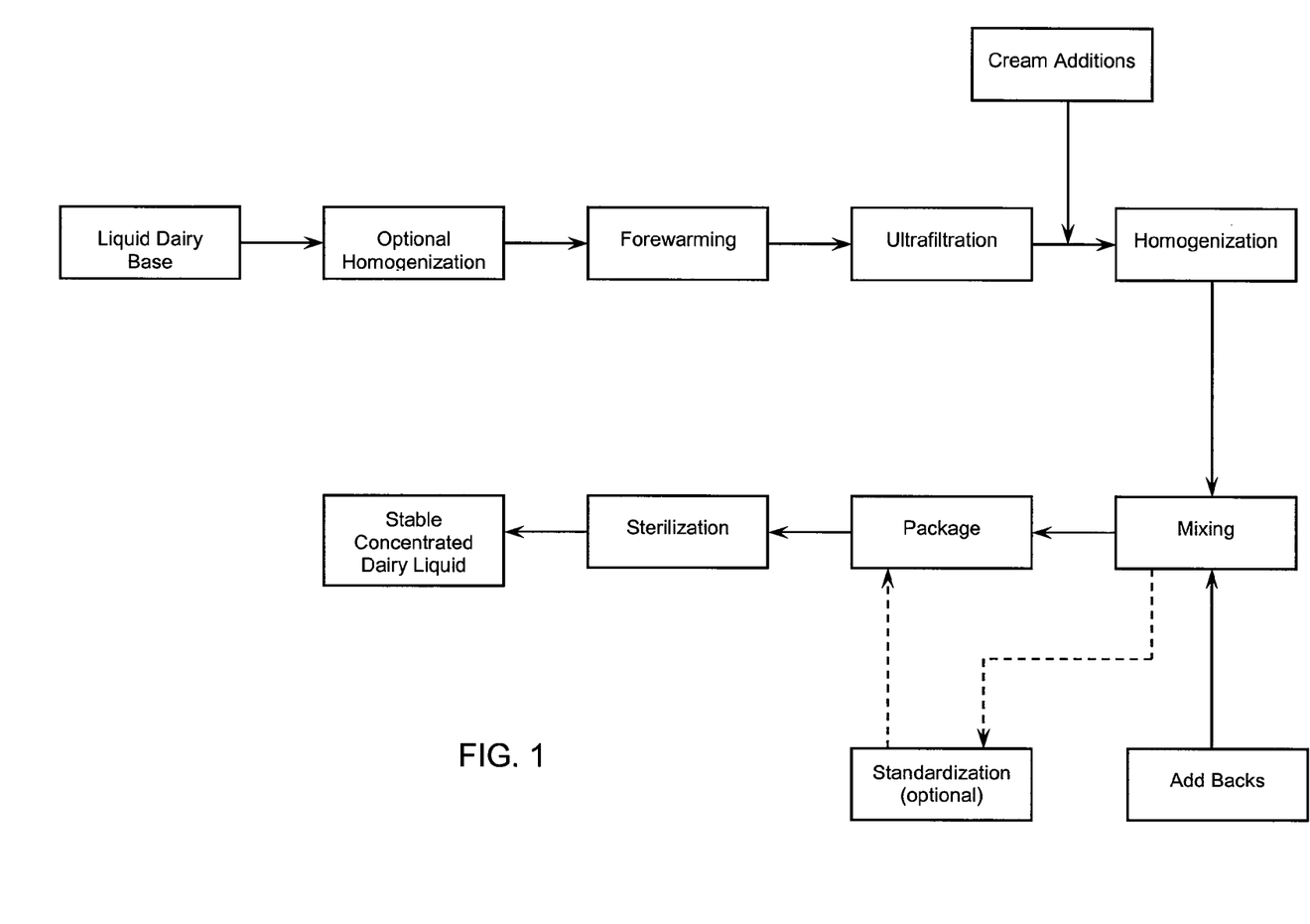
FIG. 1 is a flowchart of an exemplary method of forming a stable concentrated dairy liquid.

Turning to more details of the concentration process, FIG. 1 illustrate a general method of the present concentration process employing increased fat contents, reduced protein levels, and specific cream additions to achieve a stable concentrated dairy liquid having enhanced fresh dairy notes. In this exemplary process, a liquid dairy base is provided, which may be optionally homogenized, and then forewarmed to a temperature and for a time effective in reducing soluble protein (as measured by pH 4.6 soluble protein). The forewarmed dairy liquid is then concentrated to the desired level, generally less about 30 percent total solids or less using ultrafiltration-type techniques alone or combined with diafiltration techniques. If ultrafiltration is combined with diafiltration, the diafiltration is preferably carried during or after ultrafiltration. After the concentration step, an amount of cream is blended into the concentrated dairy liquid to form a cream enriched concentrated dairy liquid having less than about 11 percent protein (preferably, about 9 to about 11 percent protein), greater than about 15 percent fat (preferably, about 15 to about 18 percent fat), and less than about 1.5 percent lactose.

Next, the cream enriched concentrated dairy liquid is then homogenized as a combined fluid to form a homogenized cream enriched dairy liquid. At this point after homogenization, an effective amount of a stabilizer and other optional add backs may then be mixed into the homogenized cream enriched concentrated dairy liquid to form a stabilized cream enriched dairy liquid. The stabilized cream enriched dairy liquid may optionally be standardized prior to packaging if so desired. After the addition of the stabilizer, the liquid is preferably packaged and sterilized at a time and temperature sufficient to achieve a $F_o$ greater than about 5. After sterilization, the resultant stable concentrated dairy liquid preferably includes about 10 percent or less total protein (most preferably, about 5 to about 10 percent protein), about 15 percent or less total fat (most preferably about 9 to about 15 percent total fat), and less than about 1 percent lactose. Preferred compositions may have a protein to fat ratio of about 0.4 to about 0.7. With such formulation, the dairy liquid may have up to about 2.5 times as much fat as protein. Additionally, the resultant concentrated dairy liquids exhibit a reduction of about 20 to about 45 percent in sulfur and/or nitrogen containing volatiles as compared to prior dairy concentrates.

Figure 2:
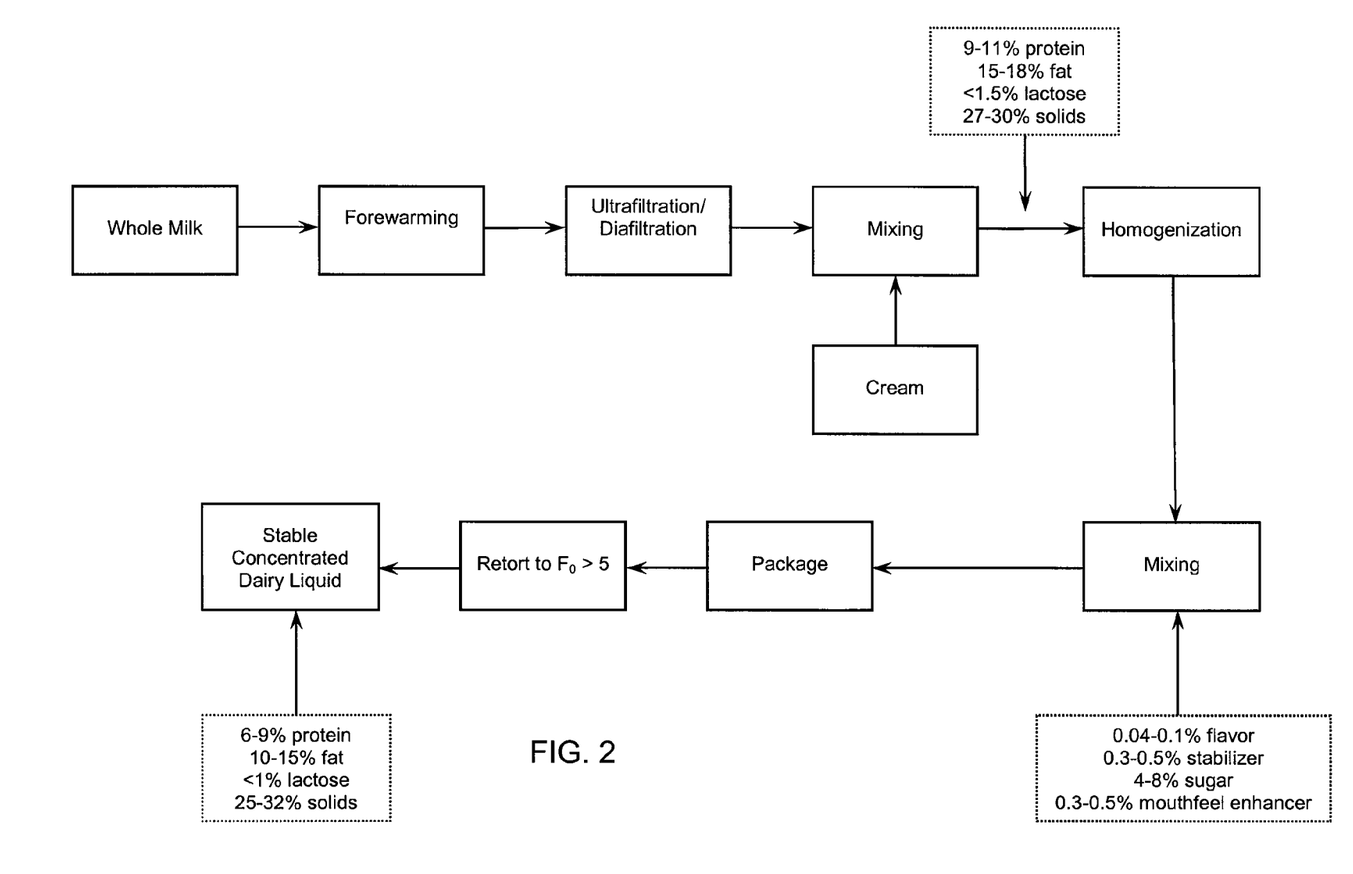
FIG. 2 is a flowchart of another exemplary method of forming a stable concentrated dairy liquid.

FIG. 2 illustrates a more preferred approach to produce a stable concentrated dairy liquid having enhanced fresh dairy flavors. As shown in FIG. 2, the starting dairy base is preferably whole milk, which is then forewarmed, for example, at least about 60° C. for about at least about 30 seconds to effect at least about a 70 percent and, preferably, at least about an 80 percent reduction in soluble proteins. Most preferably, the forewarming reduces soluble protein by about 70 percent to about 100 percent and, even more preferably, by about 70 percent to about 90 percent.

The forewarmed milk is then concentrated using ultrafiltration, preferably with diafiltration, to form a concentrated dairy liquid retentate having reduced levels of lactose and minerals. Cream is then added to the concentrated dairy liquid retentate to form a cream enriched concentrated dairy liquid having less than about 11 percent protein (preferably, about 9 to about 11 percent protein), less than about 18 percent fat (preferably, about 15 to about 18 percent fat), less than about 1.5 percent lactose, and about 25 to about 32 percent solids. The resulting cream enriched concentrated dairy liquid is then homogenized as a single dairy liquid to form a homogenized cream enriched dairy liquid Preferably, the cream is not pre-homogenized prior to being added to the process or added at other process locations as such variations can affect the final product stability.

Stabilizers or buffering salts and other optional add-backs may then be blended into the homogenized cream enriched dairy liquid. As discussed in more detail below, at least a blends of stabilizers/buffering salts (such as, for example, about 0.2 to about 0.6 percent stabilizer including about 50 to about 25 percent disodium phosphate and about 50 to about 75 percent monosodium phosphate), at least one mouthfeel enhancer (for example, about 0.3 to about 0.6 percent sodium chloride), and optional additives (for example, about 0.04 to about 0.1 percent flavor and about 4 to about 8 percent sugar) can be mixed with the homogenized cream enriched dairy liquid.

The resulting product may then be packaged and sterilized (e.g., retorted) to achieve a $F_o$ of at least 5 and to provide the desired stable concentrated dairy liquid. By one approach, the resultant stable concentrated dairy liquid has a composition of less than about 10 percent protein (preferably, about 5 to about 10 percent protein), about 15 percent or less fat (preferably, about 9 to about 15 percent fat), less than about 1 percent lactose, about 25 to about 32 percent solids, and reduced sulfur and/or nitrogen containing volatile compounds. In preferred forms, the resultant product also has a protein to fat ratio of about 0.4 to about 0.7. The fat in the stable concentrated dairy liquid is preferably supplied from the combination of the fat provided in the starting liquid dairy base, which is subjected to ultrafiltration, and also the fat provided in the cream addition, which is not subjected to ultrafiltration or pre-homogenization. Additionally, the stable concentrated dairy liquid is preferably substantially free of starches, gums, and other emulsifiers such as monoglycerides, polyadloses (10-1-O or 10-1-CC, Lonza, Inc.), glycosperses (S-20 or O-20, Lonza, Inc.), lecithin, buttermilk, and sodium caseinate.

For purposes herein, "serum protein" generally refers to the protein content of milk plasma other than casein (i.e., serum protein generally refers to the whey protein content). "Milk plasma" generally refers to the portion of raw milk remaining after removal of the fat content. "Casein" generally encompasses casein per se (i.e., acid casein) or water soluble salts thereof, such as caseinates (e.g., calcium, sodium, or potassium caseinates, and combinations thereof). Casein amounts and percentages described herein are reported based on the total amount present of casein and caseinate (excluding the metal cation amount thereof). Casein generally relates to any, or all, of the phosphoproteins in milk, and to mixtures of any of them. An important characteristic of casein is that it forms micelles in naturally occurring milk. Many casein components have been identified, including, but not limited to, $\alpha$-casein (including $\alpha_{s1}$-casein and $\alpha_{s2}$-casein), $\beta$-casein, $\gamma$-casein, $\kappa$-casein, and their genetic variants.

"Reduced fat" milk generally means about 2 percent fat milk. "Low fat" milk generally means about 1 percent fat milk. "Fat free milk" or "skim milk" both generally mean less than about 0.2 percent fat milk. "Whole milk" generally means not less than about 3.25 percent fat milk, and can be standardized or unstandardized. "Milk butter" generally means the residual product remaining after milk or cream has been made into butter and contains not less than about 3.25 percent fat. "Raw milk" generally means milk that has not yet been thermally processed. The milk or milk products used in the processes of the present invention can be standardized or non-standardized. The preferred milk is obtained from cows; however, other mammalian milk suitable for human consumption can be used if desired. "Cream" generally refers to a sweet cream, which is a cream or fat obtained from the separation of a whole milk. Preferred creams used herein have a fat content from about 32 to about 42 percent, about 3 to about 5 percent lactose, and less than about 2 percent protein.

"Shelf-life" or "shelf-stable" means the period of time at which a dairy product can be stored at about 70° F. to about 75° F. without developing an objectionable aroma, appearance, taste, consistency, or mouthfeel. In addition, an organoleptically acceptable dairy product at a given shelf life will have no off-odor, off-flavor, or brown coloring. "Stable" or "shelf-stable" means that the dairy product at a given time does not have objectionable organoleptic characteristics as defined above and is organoleptically acceptable. Stable or shelf-stable also means a Brew Recovery of at least about 90 percent. Brew Recovery is a measurement of the dairy solids that are recovered in a cup as compared to the starting dairy solids when reconstituted at ambient conditions. For purposes herein, Brew Recovery was measured using a Tassimo Beverage Brewer and a standard Tassimo creamer T-Disc (Kraft Foods).

"Total milk solids" or "total solids" generally refers to the total of the fat and solid-not-fat (SNF) contents. "SNF" generally refers to the total weight of the protein, lactose, minerals, acids, enzymes, and vitamins.

Essentially any liquid dairy base can be used in the present method. Preferably, the liquid dairy base originates from any lactating livestock animal whose milk is useful as a source of human food. Such livestock animals include, by way of non-limiting example, cows, buffalos, other ruminates, goats, sheep, and the like. Generally, however, cow's milk is preferred as the starting material. The milk used may be whole milk, low-fat milk, or skim milk. As the process targets a concentrated stable dairy liquid having an increased fat content, it is preferred to start with whole milk; however, the starting dairy source may also be skim or low-fat milk as needed for a particular application with more or less cream additions as needed to obtain the target fat values.

Cow's milk contains lactose, fat, protein, minerals, and water, as well as smaller amounts of acids, enzymes, gases, and vitamins. Although many factors may affect the composition of raw cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Although milk contains many types of proteins, they generally can be grouped into the two general categories: casein proteins and serum proteins. The minerals, also known as milk salts or ash, generally include, as the major components, calcium, sodium, potassium, and magnesium; these cations can combine with phosphates, chlorides, and citrates in milk. Milk fat is mostly comprised of triglycerides, and smaller amounts of various other lipids. Lactose or milk sugar (4-O-β-D-galactopyranosyl-D-glucose) is a reducible disaccharide present in raw milk.

Turning to more of the details on the process, each process step will now be discussed in more detail. To begin with, the liquid dairy base, which is preferably whole milk, is initially forewarmed or preheated. Forewarming can be accomplished using any method or equipment known in the art (such as, for example, jacketed reactors, heat exchangers, and the like) to achieve the desired temperatures. Not wishing to be limited by theory, it is believed that forewarming initially crosslinks the serum or whey proteins to the casein micelles present in the milk; most crosslinking is likely to occur to the outer surfaces of the micelles. Such crosslinking will reduce the amount of soluble protein. Again, not wishing to be limited by theory, forewarming may also allow the whey proteins to interact covalently and/or hydrophobically with the micelles and especially with the outer surfaces of the micelles. Again, not wishing to be limited by theory, it is further believed that these interactions generally accomplish at least two effects. First, the interaction removes many of the whey proteins from solution; this effect may be important because the whey proteins are very reactive at high temperatures, such as those experienced in sterilization. Secondly, as the casein micelles become coated with serum or whey proteins, casein-casein interactions should be reduced and/or minimized; this effect should reduce the tendency of thermally-induced milk gels to form.

As noted, crosslinking during forewarming decreases the amount of soluble protein. The amount of soluble protein can be determined by acid precipitation followed by liquid chromatography coupled with UV detector (LC-UV). Comparison is made between forewarmed or heat processed samples and non-heat treated samples to quantify soluble protein fractions. The reduction in pH 4.6 soluble protein should be at least about 70 percent, preferably about 70 to about 100 percent, and more preferably about 70 to about 90 percent. Reductions in soluble protein are measured as pH 4.6 soluble protein, which is preferably in a method specific for the quantization of α-lactalbumin and β-lactoglobulin serum proteins based on the methodologies published in J. Agric. Food Chem. 1996, 44, 3955-3959 and Int. J. Food Sci. Tech. 2000, 35, 193-200, which are both incorporated herein by reference.

The time and temperature of the forewarming step should be sufficient to obtain the desired reduction of pH 4.6 soluble protein while maintaining the desired stability of the liquid milk product during sterilization and subsequent storage. Of course, other parameters, in addition to the forewarming conditions, may affect stability during sterilization and subsequent storage.

By one approach, the forewarming or preheating of the dairy liquid is generally undertaken at least about 60° C. for at least about 30 seconds to form a preheated dairy liquid having the reduced levels of pH 4.6 soluble protein. By other approaches, forewarming is conducted at about 70° F. to about 100° C. for about 0.5 to about 20 minutes. By even other approaches, the forewarming is conducted at about 85 to about 95° C. at about 2 to about 6 minutes. Other forewarming conditions may also be used so long as the desired degree of crosslinking (generally as measured by a reduction pH 4.6 soluble protein) and the desired stability of the final product is obtained. Of course, other forewarming conditions can be used so long as the desired stability is obtained. For example, a two-stage process comprising a first stage at about 80° C. to about 100° C. for about 2 to about 6 minutes followed by a second stage at about 100° C. to about 130° C. for about 1 to about 60 seconds can be used.

After the forewarming step, the forewarmed dairy liquid is concentrated to the desired solids level to form a concentrated dairy liquid retentate. Concentration may be completed by ultrafiltration with or without diafiltration. For purposes of the methods herein, ultrafiltration is considered to include other membrane concentrations methods such a microfiltration and nanofiltration. Examples of suitable methods involving microfiltration, ultrafiltration, and diafiltration to concentrate a dairy liquid are found in U.S. Patent Publication Number 2004/0067296 A1 (Apr. 8, 2004), which is incorporated herein by reference.

By one approach, it is preferred to concentrate the forewarmed dairy liquid by at least about 2.7 fold (and preferably by at least about 3 fold, and more preferably by at least about 4 fold) to form a concentrated dairy liquid having a total solids content of about 24 to about 28 percent, a protein level of about 9 to about 16 percent, a fat level of about 11 to about 19 percent, and a lactose level of about 0.5 to about 1.5 percent. Using ultrafiltration, a significant amount (generally at least about 40 percent and more preferably at least about 95 percent) of the lactose and minerals are removed during the concentration step.

The concentration step is carried out using ultrafiltration, preferably with diafiltration, using a membrane pore size large enough to permit a portion of the lactose and minerals to pass through the pores with water as the permeate, while the retentate includes essentially all the protein and fat content. For example, the preferred whole milk base can be subjected to a membrane separation treatment to separate a protein-enriched "retentate" from a lactose-enriched permeate. However, the type of milk processed according to the methods herein is not particularly limited, and may also includes, for example, skim milk, reduced fat milk, low fat milk, butter milk, and combinations thereof.

By one approach, the membrane filtration may include a molecular weight (MW) cut off of approximately about 10,000 to about 20,000 Daltons using a porous polysulfone-type membrane and the like, about 35 to about 65 psig applied pressure, and a processing temperature of about 123° F. to about 140° F. (about 50° C. to about 60° C.). In one embodiment, lactose and minerals pass through the membrane in an about 50 percent separation ratio, and the retentate comprises about 100 percent of the fat and protein, about 50 percent of the lactose, and about 50 percent of free minerals relative to the feed stream. Diafiltration serves to keep the lactose concentration in the retentate below about 4 percent.

After concentration, an amount of cream is blended into the concentrated dairy liquid retentate to increase the fat content and form a cream enriched concentrated dairy liquid. By one approach, about 3 to about 57 percent cream is blended with the concentrated dairy liquid retentate to increase the fat content. Preferably, the cream is a sweet cream having a total fat content of about 32 to about 42 percent but other types of cream may also be used depending on availability.

By other approaches, when the starting liquid dairy base is whole milk, about 3 to about 34 percent cream is added to the concentrated dairy liquid retentate. Optionally, if the starting liquid dairy base is skim milk, then about 34 to about 57 percent cream is added to the concentrated dairy liquid retentate. If the starting liquid dairy base is 2% milk, then about 20 to about 46 percent cream is added to the concentrated dairy liquid retentate. In each case after concentration, the appropriate amount of cream is added to form a cream enriched concentrated dairy liquid having less than about 11 percent protein (preferably, about 9 to about 11 percent protein), greater than about 15 percent fat (preferably, about 15 to about 18 percent fat), less than about 1.5 percent lactose, and about 25 to about 30 percent total solids.

As mentioned above, it has been discovered that the cream addition point can affect the stability of the resultant dairy liquid after sterilization By one approach, it is preferred that the amount of cream is blended into the dairy liquid after concentration and before homogenization and also before the addition of the stabilizers and optional add-back ingredients. As discussed more below in the Examples, it has been discovered that other cream addition points, such as prior to concentration or after homogenization, result in gelled and separated concentrates after sterilization.

By adding the cream prior to the concentration step (such as before the forewarming), then the cream would be subjected to the ultrafiltration membrane along with the liquid dairy base. In this manner, the ultrafiltration would likely strip minerals and other natural sugars from the cream.

Preferably, the cream is also not pre-homogenized prior to blending with the concentrated dairy liquid retentate, but simply added in its native state. As discussed more below in the Examples, it was discovered that pre-homogenizing the cream generally resulted in concentrated beverages that either gelled or separated into two or more phases upon retorting. While not wishing to be limited by theory, it is believed that pre-homogenizing the cream produces a less stable emulsion because the cream generally has insufficient protein to further emulsify or reduce the native cream fat droplet size distribution. For example, it is believed there is an increased probability of producing flocs of fat droplets that may increase the rate of phase separation and/or retort gelation in the final product when the cream is first pre-homogenized. Therefore, it is preferable to reduce cream fat droplet size after its addition to the retentate where there is an abundance of protein for homogenization.

After concentration and optional chilling, the cream enriched concentrated dairy liquid is homogenized as a single liquid to form a homogenized cream enriched dairy liquid. By one approach, the homogenization may be performed in one or multiple stages. For instance, in one non-limiting approach, a first homogenization stage can be performed at about 1,500 to about 2,000 psi and a second stage at about 100 to about 300 psi in an industry standard homogenizer. The homogenate may be cooled if it will not be immediately conducted to a packaging operation. For example, the homogenate may be cooled as it flows through a regeneration and cooling section of a plate heat exchanger of a standard homogenizer. Other homogenization schemes applicable to milk products also may be used; however, as described in more detail in the Examples, increased homogenized pressures generally result in gelled or separated final products. While not wishing to be limited by theory, it is believed that higher homogenization conditions do not result in acceptable beverages because the higher pressure homogenates will generally have larger numbers of smaller particles that will lead to a higher probability of their gelation due to higher collision frequency and subsequent linking of droplets together.

As discussed above, to obtain a stable concentrate, the cream is preferably added prior to the homogenization step. As provided in more detail below in the Examples, it was discovered that adding the cream after homogenization also resulted in non-stable concentrates after sterilization. While not wishing to be limited by theory, it is believed that the added fat supplied by the cream requires homogenization to produce a fat particle to survive the sterilization process as well as an extended shelf life. As noted above, it is preferred that the cream is not pre-homogenized prior to being added to the retentate, but it is preferred that the cream is subjected to homogenization in combination with the retentate in order to enhance the final product stability. For example, it is believed that homogenization not only reduces the fat droplet size distribution from the cream to delay any post-retort separation, but it also likely coats each fat droplet with a protein interface that will allow all the fat droplets to behave more uniformly or consistently with the additives and subsequent retort conditions. Furthermore, cream homogenization in the retentate where there is an abundance of emulsifying proteins, will produce single fat droplets with minimal flocculation. Insufficient protein results in an increased tendency to produce flocculated droplets. Flocculated droplets are more likely to accelerate phase separation as well as gel formation during or after retort conditions.

After homogenization, effective amounts of a stabilizer may be added to the homogenized cream enriched dairy liquid. The stabilizer may be a chaotropic agent, a calcium-binding buffer, or other stabilizer which effectively binds calcium to prevent gelation or separation of the concentrated dairy liquid during storage. While not wishing to be limited by theory and as is detailed in U.S. Patent Publication Number 2004/0067296 A1 (Apr. 8, 2004), it is believed that the calcium-binding stabilizer prevents gelation or separation of the dairy liquid during any storage prior to the subsequent sterilization. In general, any buffer or chaotropic agent or stabilizer which binds calcium may be used. Examples of suitable calcium-binding buffers, stabilizers, and chaotropic agents include citrate and phosphate buffers, such as monosodium phosphate, disodium phosphate, dipotassium phosphate, disodium citrate, trisodium citrate, EDTA, and the like as well as mixtures thereof.

A preferred buffering salt or stabilizer is a blend of monosodium phosphate and disodium phosphate. An effective amount of this stabilizer blend generally depends on the specific dairy liquid used as the starting material, the concentration desired, the amounts of cream added, and the calcium binding capacity of the specific stabilizers used. However, in general, for the cream enriched concentrated dairy liquid, about 0.2 to about 0.6 percent stabilizer that includes about 25 to about 50 percent monosodium phosphate and about 75 to about 50 percent disodium phosphate are effective stabilizers for the cream enriched and concentrated dairy liquid. By one approach, a ratio of the monosodium phosphate to the disodium phosphate ranges from about 50:50 to about 75:25 to form a stable concentrate. With the ultrafiltered whole milk and cream additions, stabilizer ratios outside of this range generally form gelled or separated concentrates after sterilization.

Other optional ingredients may also be included in the add backs. By one approach, mouthfeel enhancers, flavors, sugars, and other additives may also be added as needed for a particular application. For example, suitable mouthfeel enhancers include sodium chloride, potassium chloride, sodium sulfate, and mixtures thereof. Preferred mouthfeel enhancers include sodium chloride and potassium chloride as well as mixtures thereof; sodium chloride is the most preferred mouthfeel enhancer. Flavors and other additives such as sugar, sweeteners (natural and/or artificial), emulsifiers, fat mimetics, maltodextrin, fibers, starches, gums, and enzyme-treated, cultured, natural, and artificial flavors or flavor extracts can be added so long as they do not significantly and adversely effect either the stability or mouthfeel characteristics.

After concentration and optional chilling, the dairy liquid is then mixed with the effective amounts of the stabilizer and optional other ingredients as described above and, then, sterilized to form the stable concentrated dairy liquid. Preferably, sterilization is carried out using retorting conditions. Optionally, if the concentrated dairy liquid needs to be diluted to meet a targeted concentration, the dilution should be accomplished prior to sterilization. Preferably, the dairy liquid is packaged, sealed, and then subjected to sterilization temperatures in any suitable equipment. Sterilization is carried out under time and temperature conditions to achieve a $F_o$ of at least 5 minutes as required for commercial sterility and nominally up to about 13.5 minutes. Generally, the sterilization process consists of a come-up or heating time, a holding time, and a cool-down time. During the come-up time, a temperature of about 118° C. to about 145° C. is achieved in about 1 second to about 30 minutes. The temperature is then maintained at about 118° C. to about 145° C. for about 1.5 seconds to about 15 minutes. The temperature is then cooled below about 25° C. within about 10 minutes or less. Preferably the sample is gently agitated (for instance, by rotating the container) during sterilization to minimize skin formation.

The overall thermal treatment (in this case, forewarming, concentration, and sterilization) is controlled to produce the stable concentrated dairy liquid, which preferably has a protein to fat ratio of about 0.4 to about 0.7, while achieving a $F_o$ of at least about 5 and a shelf life of at least about 9 months under ambient conditions. Generally, the stable concentrated dairy liquid of the present invention has a viscosity ranging from about 70 mPa-s to about 4000 mPa-s and, preferably, about 100 mPa-s to about 300 mPa-s at ambient temperatures when measured by a Brookfield RV viscometer at about 20° C. using Spindle #2 at 100 rpm.

As mentioned above, the sterilizing process may degrade the proteins in the concentrate and form trace amounts of sulfur and/or nitrogen containing volatile compounds that can negatively affect flavors and/or aromas. The formulation and processes herein, on the other hand, form reduced amounts of such compounds and, as a result, have enhanced fresh dairy flavors. For example, the resultant stable concentrated dairy liquids herein with about 9 percent or less total protein and cream enrichment generally exhibit a reduction in sulfur and/or nitrogen aroma intensities due to a reduction in sulfur and/or nitrogen containing volatiles of about 20 to about 45 percent as compared to prior concentrates based on a GC/O analysis. For example, as provided in more detail in the Examples, a panel of trained taste and aroma testers noted that dairy concentrates made by the present methods exhibit sulfur and/or nitrogen aroma intensity values of about 2.75 or less (on a 15 point scale). Concentrated dairy liquids having such levels of these compounds generally exhibit an enhanced fresh dairy flavor and notes.

The packaging technique used is not particularly limited as long as it preserves the integrity of the dairy product sufficient for the applicable shelf life of the dairy product. For example, milk concentrates can be sterilized or retorted in glass bottles or gable-top cartons, and so forth, which are filled, sealed, and the contents are then thermally processed. The dairy products also can be packaged in larger quantities such as in conventional bag-in-box containers or totes. In one embodiment, pre-sterilized bottles or foil-lined gable-top carton materials may be used. Food packaging systems designated as extended shelf life (ESL) or aseptic packaging systems may also be used, but the methods herein are not limited thereto. The useful food packaging systems include conventional systems applied or applicable to flowable food products, especially milk products and fruit juices. The samples may be gently agitated (e.g., rotating the container) during sterilization to minimize "skin" formation. The dairy product also may be loaded into and transported in bulk form via tanker trucks or rail car tankers.

Although not required to achieve the extended shelf lives associated with dairy products of the present invention, pasteurization and/or ultra-high temperature (UHT) procedures also may be applied to dairy products of the present invention in the event of process interruption and/or for further shelf life enhancement. UHT products are ultrapasteurized and then packaged in sterilized containers. Moreover, one advantage of the present invention is that UHT processing is generally not required to obtain extended shelf lives, such as required by some prior concentrates. For example, if the ultrafiltered/diafiltered product is to be held for an extended period of time (e.g., greater than about a day) before continuing the process, pasteurization of the ultrafiltered product may be undertaken. If desired, intermediate products in the process may be pasteurized if desired so long as the pasteurization does adversely affect stability or mouthfeel of the final product.

In one approach, the resultant stable concentrated dairy liquid is an organoleptically pleasing milk that may be sealed in cartridges or pods to be used in any number of beverage preparation machines. Examples of preferred uses and beverage preparation machines can be found in U.S. patent application Ser. No. 10/763,680, filed Jan. 23, 2004, which is incorporated herein by reference in its entirety, and owned by the same assignee as the present specification. The concentration of the milk is beneficial because it allows for larger volumes of the milk to be dispensed from the beverage preparation machines while being able to store a smaller package with less quantity of liquid.

For instance, a cartridge of the concentrated milk may be used to produce an authentic looking frothy milk-based foam desired by consumers in a cappuccino-style beverage. The fat to protein ratios and specified cream addition points form a concentrated dairy liquid having enhanced fresh dairy notes suitable for forming whitened coffee products such as, cappuccinos, lattes, and the like. For instance, the cartridge of the stable concentrated milk may also be suitable for foaming using a low pressure preparation machine and cartridge as described in U.S. patent application Ser. No. 10/763,680 using only pressures below about 2 bar.

By another approach, a dairy beverage may also be formed using the stable concentrated dairy liquid. For example, a beverage may be formed by mixing the stable concentrated dairy liquid with an aqueous medium, such as water. The formed dairy beverage may also be dispensed from a cartridge containing the stable concentrated dairy liquid, also described in U.S. patent application Ser. No. 10/763,680, by passing an aqueous medium through the cartridge to form a beverage by dilution. In one such example, the stable concentrated dairy liquid may preferably be mixed or diluted with the aqueous medium in a ratio of between about 1:1 to about 6:1 to form a dairy beverage.

Advantages and embodiments of the cream enriched concentrates described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

Various concentrated dairy liquids having total solids of about 20 to about 36 percent were prepared according to the methods described above. A whole milk having about 4 to 5 percent fat was used as the liquid dairy base and forewarmed at about 90° C. for about 300 seconds to produce a forewarmed milk. The forewarmed milk was then ultrafiltered using a Koch ultrafiltration spiral wound membrane having about a 10,000 Dalton (10 kDa) MWCO. Diafiltration was then used to decrease the lactose to about 1 percent.

Cream (about 36 percent fat) was added to the ultrafiltered milk to produce a 15 percent cream enriched concentrated dairy liquid. The cream enriched concentrated dairy liquid was then homogenized using a two-stage APV homogenizer at about 2000 psi (first stage) and about 200 psi (second stage) to produce a homogenized cream enriched dairy liquid. Various ranges of monosodium phosphate (MSP) and disodium phosphate (DSP), sugar, salt, and flavors were added to the homogenized dairy liquid.

About 49 to about 53 grams of the homogenized dairy liquid was then packaged in a sealed Tassimo creamer T-Disc (Kraft Foods) and retorted using a Surdry Stock America Sterilization system at about 123° C. for about 8 minutes to produce a sterilized beverage having a $F_o$ of about 7. The results and specific conditions of a number of inventive samples are summarized in Table 1 below. All samples resulted in a fluid concentrate after retort and remained fluid for up to about 6 months.

Example 2

A study was completed to compare the sulfur and nitrogen aroma intensities of concentrates made per the methods of Example 1 as compared to a concentrated dairy liquid made per the method of Cale (US Publication No. 2007/0172548) using a GC/O analysis (Gas chromatography-olfactometry). GC/O analysis combines olfactometry or the use of a trained panel of odor detectors to analyze odor activity in defined air streams through the use of a gas chromatographic (GC) separation of volatiles.

Samples of liquid dairy concentrates of Table 2 below were isolated using a purge and Trap GC analysis. A trained panel of odor detector then rated the intensity values for sulfur and nitrogen containing volatiles as separated by the GC. For purposes herein, sulfur and nitrogen containing volatiles were identified as odors associated with the following categories as separated by a gas chromatograph at the reference duration times: cabbage (2.10 minutes); garlic, oily (4.78 minutes); skunky, oily (6.04 minutes); garlic, oily (6.65 minutes); garlic (8.15 minutes); meaty, sulfurous (12.96 minutes); garlic (13.52 minutes); meaty (16.43 minutes); nutty, brown, caramelized (14.05 minutes); nutty (7.85 minutes); nutty, brown, caramelized (8.00 minutes); corn chip (8.06 minutes); and still nutty (8.30 minutes).

An approximately 80 gram sample of each milk concentrate of Table 2 was isolated using a purge and Trap set at about 60° C. for about 45 minutes using a trapping tube (200 mg Tenax). The isolate was then run on an FRAP column with an initial temperature of about 40° C., a ramping rate of about 8° C./minutes and a final temperature of about 220° C. Aroma intensity values were then collected for the sulfur and nitrogen containing compounds as defined above. As shown in the Table 3 below, a reduction of about 20 to about 45 percent in total sulfur and/or nitrogen containing volatiles was noted between the milk produced as in Example 1 (i.e., stable concentrated dairy liquids having cream enrichment and reduced levels of protein) as compared to the milk produced by the methods of Cale (i.e., a concentrated dairy liquid without cream enrichment). Table 3 below provides a comparison of the aroma intensity values where the total sulfur and nitrogen notes is the sum of the individual odors for each sample. It is believed that the overall reduction in total sulfur and nitrogen aroma intensities is also indicative of a reduction in sulfur and nitrogen containing volatile compounds.

TABLE 1

Summary of Retort Stable and Shelf Stable Concentrates

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 30-36 | 50:50 | 12-15 | 6-8 | 10:1 to 38:1 | 5-7 | 0.5 | 0.3-0.4 | Fluid no phase separation |
| 20-36 | 50:50 | 11-15 | 6-9 | 18:1 | 5.7 | 0.5 | 0.3-0.4 | Fluid, no phase separation |
| 25-34 | 50-75:50-25 | 10-17 | 6-9 | 10:1 to 34:1 | 5.7 | 0.5 | 0.3-0.4 | Fluid, no phase separation |

TABLE 2

Samples Tested

| Sample | Protein:Fat | Solids, % | Protein, % | Fat, % | Lactose, % |
|---|---|---|---|---|---|
| 1 | 0.4 | 31 | 5.4 | 12.3 | 0.3 |
| 2 | 0.5 | 31.4 | 5.6 | 12.3 | 0.3 |
| Comparative | 1.5 | 26.8 | 11.4 | 7.4 | 0.8 |

TABLE 3

Aroma Intensity Values - Sulfur and/or Nitrogen Aroma Intensities

| Odor | Comparative | 1 | 2 |
|---|---|---|---|
| cabbage (2.10 minutes) | 0.25 | 0.25 | 0.00 |
| garlic, oily (4.78 minutes) | 0.50 | 0.00 | 0.00 |
| skunky, oily (6.04 minutes) | 0.00 | 0.25 | 0.00 |
| garlic, oily (6.65 minutes) | 0.00 | 0.00 | 0.00 |
| garlic (8.15 minutes) | 1.00 | 1.00 | 0.50 |
| meaty, sulfurous (12.96 minutes) | 0.00 | 0.25 | 0.75 |
| garlic (13.52 minutes) | 0.25 | 0.25 | 0.00 |

TABLE 3-continued

Aroma Intensity Values - Sulfur and/or Nitrogen Aroma Intensities

| Odor | Comparative | 1 | 2 |
|---|---|---|---|
| meaty (16.43 minutes) | 0.00 | 0.00 | 0.00 |
| nutty, brown, caramelized (14.05 minutes) | 0.00 | 0.00 | 0.00 |
| nutty (7.85 minutes) | 0.00 | 0.00 | 0.00 |
| nutty, brown, caramelized (8.00 minutes) | 0.50 | 0.50 | 0.25 |
| cornchip (8.06 minutes) | 1.00 | 0.25 | 0.50 |
| still nutty (8.30 minutes) | 0.00 | 0.00 | 0.00 |
| Total Sulfur and Nitrogen Notes | 3.50 | 2.75 | 2.00 |
| % Reduction | | 21% | 43% |

Example 3

Coffee products including a dairy concentrate were evaluated by a trained panel of taste testers to compare the milky and dairy flavor notes. Skim milk, 2% milk, or whole milk was used as the starting dairy base and made into concentrates using the process of Example 1. The following samples were tested as provided in Table 4.

TABLE 4

| Sample | Dairy Base, % | Cream, % | Protein, % | Lactose, % | Fat, % | Solids | Weight, g |
|---|---|---|---|---|---|---|---|
| 1 (Skim + Cream) | 60 | 40 | 5-6 | 2 | 10-11 | 26-27 | 5.5 |
| 2 (Skim + Cream) | 60 | 40 | 6-7 | 2 | 12-13 | 28-29 | 6.5 |
| 3 (2% + Cream) | 74 | 26 | 6-7 | 1-2 | 10-11 | 25-26 | 5.5 |
| 4 (2% + Cream) | 74 | 26 | 7-8 | 1-2 | 12-13 | 28-29 | 6.5 |
| 5 (Whole + Cream) | 85 | 15 | 6-7 | 1-2 | 10-11 | 24-25 | 5.5 |
| 6 (Whole + Cream) | 85 | 15 | 7-8 | 1-2 | 12-13 | 27-28 | 6.5 |

Figure 3:
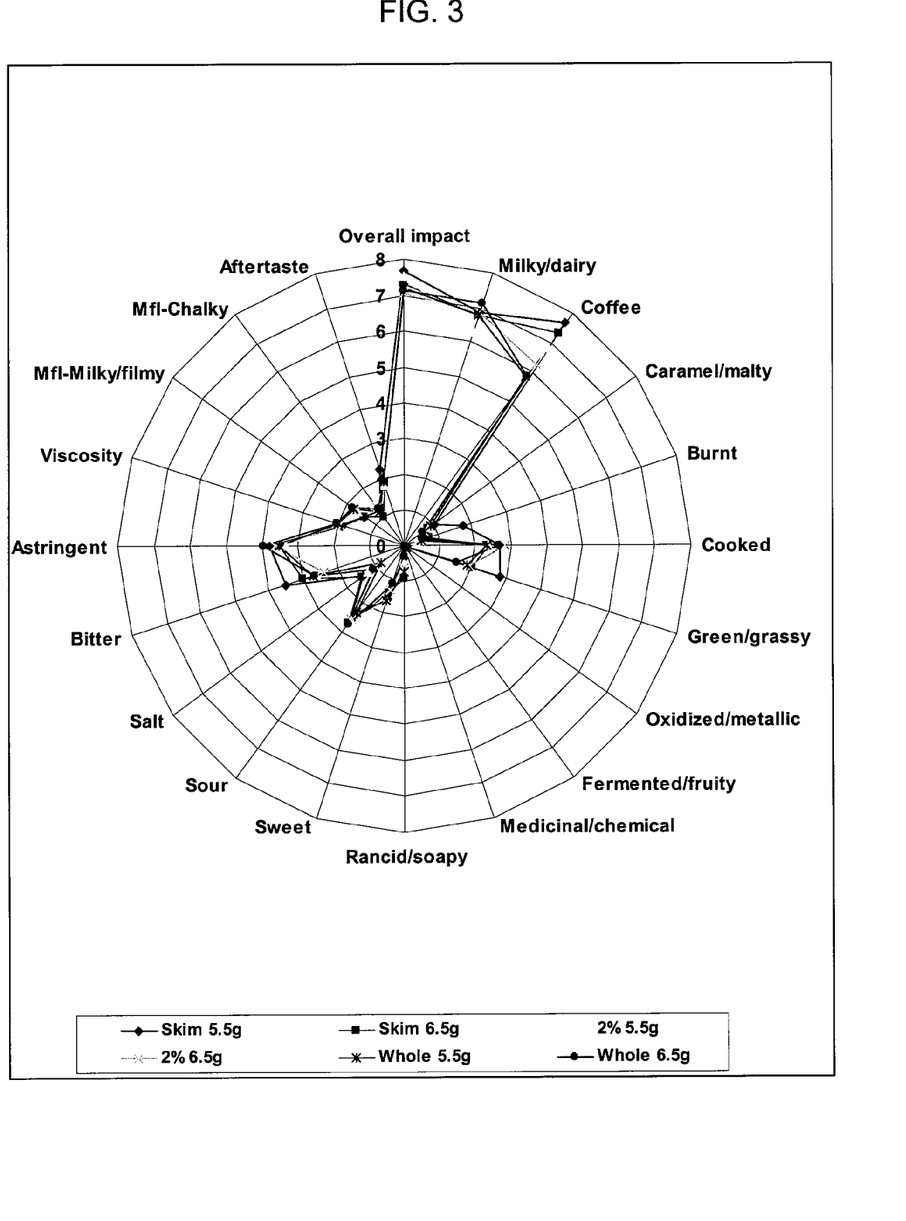
FIG. 3 is a sensory evaluation chart of concentrated dairy products.

The concentrated samples were then loaded into a Tassimo creamer T-Disc (Kraft Foods) in order to prepare a dairy beverage using a Tassimo Beverage Brewer. A latte was prepared using a Gevalia Espresso T-Disc (Kraft Foods) along with the concentrated dairy samples of Table 4. Each sample was tested by a trained panel of taste testers. The samples were randomized throughout the study and rated on a scale of 0 to 15 (none to extreme) to rate various flavor notes. The results of this study are provided in Table 5 and in the Graph of FIG. 3.

TABLE 5

| | Skim + Cream 5.5 g | Skim + Cream 6.5 g | 2% + Cream 5.5 g | 2% + Cream 6.5 g | Whole + Cream 5.5 g | Whole + Cream 6.5 g | Statistical* |
|---|---|---|---|---|---|---|---|
| Overall impact | 7.66 | 7.32 | 7.52 | 7.04 | 7.20 | 7.12 | a, a, a, a, a, a |
| Milky/dairy | 6.84 | 6.74 | 6.26 | 6.82 | 6.76 | 7.12 | a, a, a, a, a, a |
| Coffee | 7.68 | 7.30 | 6.84 | 6.24 | 5.82 | 5.84 | a, ab, bc, cd, d, d |
| Caramel/malty | 1.04 | 0.82 | 0.87 | 0.67 | 0.92 | 0.62 | a, a, a, ab, a, ab |
| Burnt | 1.72 | 0.74 | 0.42 | 0.50 | 0.52 | 0.56 | a, bc, c, bc, bc, bc |
| Cooked | 2.66 | 2.32 | 2.34 | 2.82 | 2.30 | 2.64 | a, a, a, a, a, a |
| Green/grassy | 2.80 | 2.00 | 1.82 | 1.94 | 1.84 | 1.54 | a, ab, b, bc, bc, bc |
| Oxidized/metallic | 0.06 | 0.02 | 0.06 | 0.06 | 0.06 | 0.06 | a, a, a, a, a, a |
| Fermented/fruity | 0.06 | 0.04 | 0.06 | 0.08 | 0.06 | 0.04 | a, a, a, a, a, a |
| Medicinal/chemical | 0.04 | 0.06 | 0.06 | 0.24 | 0.06 | 0.06 | a, a, a, a, a, a |
| Rancid/soapy | 0.34 | 0.92 | 0.48 | 0.62 | 0.72 | 0.31 | a, a, a, a, a, a |
| Sweet | 1.56 | 1.38 | 1.60 | 1.30 | 1.60 | 1.08 | a, a, a, a, a, a |
| Sour | 2.56 | 2.68 | 2.56 | 2.52 | 2.30 | 2.70 | a, a, a, a, a, a |
| Salt | 1.44 | 1.48 | 1.26 | 1.00 | 0.80 | 1.10 | a, a, a, a, a, a |
| Bitter | 3.50 | 3.00 | 2.62 | 2.38 | 2.70 | 2.66 | ab, abc, c, c, abc, bc |
| Astringent | 3.78 | 3.50 | 3.32 | 3.62 | 3.52 | 3.94 | a, a, a, a, a, a |
| Viscosity | 1.84 | 1.86 | 2.00 | 1.92 | 1.96 | 2.00 | a, a, a, a, a, a |
| Mouthfeel-Milky/filmy | 1.40 | 1.40 | 1.60 | 1.70 | 1.74 | 1.84 | a, a, a, a, a, a |

TABLE 5-continued

|  | Skim + Cream 5.5 g | Skim + Cream 6.5 g | 2% + Cream 5.5 g | 2% + Cream 6.5 g | Whole + Cream 5.5 g | Whole + Cream 6.5 g | Statistical* |
|---|---|---|---|---|---|---|---|
| Mouthfeel-Chalky | 1.20 | 1.00 | 1.44 | 1.32 | 1.16 | 1.24 | a, a, a, a, a, a |
| Aftertaste | 2.24 | 1.82 | 1.74 | 1.88 | 1.90 | 1.90 | a, a, a, a, a, a |

*Means with the same letter are not significantly different from each other.

For purposes herein, a coffee beverage having a fresh dairy flavor, therefore, generally means a concentrated dairy product generally corresponding to the flavor attributes as described in Tables 3 and 5 above when perceived by a panel of trained taste testers.

Comparative Example 1

Comparative concentrated dairy liquids were prepared as in Example 1, except the cream addition was after the homogenization step. In some studies for this Example, the cream was first pre-homogenized using the same two-stage homogenizer as in Example 1 where the first stage ranged from 500 to 3000 psi and the second stage ranged from 50 to 300 psi. In other studies for this Example, the cream was added in its native form (without any pre-homogenization). In this example, the concentrated dairy liquid (prior to cream addition) was homogenized using the two-stage homogenizer of Example 1 at using 4000 and 400 psi. (For this Example, the concentrated dairy liquid and cream were homogenized separately and combined afterwards.) All of these comparative examples either gelled after retort or resulted in a liquid that separated into two phases (i.e., bimodal). The results and conditions of a number of comparative samples are summarized in Table 6 below.

TABLE 6

Comparative Examples

| Cream Pre-Homogenization | Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|---|
| No | 27-38 | 50:50 | 9-24 | 4-8 | 11:1 to 40:1 | 5-7 | 0.5 | 0.3-0.4 | Fluid, bimodal |
| 500/50 psi | 28-38 | 50:50 | 9-12 | 5-7 | 22:1 to 29:1 | 5-7 | 0.5 | 0.3-0.4 | Fluid, bimodal |
| 1000/100 psi | 28-32 | 50:50 | 9-12 | 5-7 | 22:1 to 29:1 | 5-7 | 0.5 | 0.3-0.4 | Fluid, bimodal |
| 2000/200 psi | 28-32 | 50:50 | 9-12 | 5-7 | 22:1 to 29:1 | 5-7 | 0.5 | 0.3-0.4 | Fluid, bimodal |
| 3000/300 psi | 28-32 | 50:50 | 9-12 | 5-7 | 22:1 to 29:1 | 5-7 | 0.5 | 0.3-0.4 | Fluid, bimodal |

Comparative Example 2

Comparative concentrated dairy liquids were prepared according to the process described in Example 1, but the cream was added to the dairy liquid prior to the forewarming step. In these studies, therefore, the cream was forewarmed and concentrated along with the whole milk and then homogenized together with the concentrated dairy liquid. In these studies, the homogenization was also carried out after concentration using the two stage homogenizer of Example 1 at 4000 and 400 psi. The cream was not pre-homogenized prior to addition. A summary of the results and conditions of a number of these comparative samples are provided in Table 7 below. All comparative samples gelled out of retort.

TABLE 7

Comparative Samples

| Total Solids | MSP:DSP Ratio | Fat, % | Protein, % | Buffering:Total Buffering Salt | Sugar, % | NaCl, % | Buffering Salt, % | Status Post Retort |
|---|---|---|---|---|---|---|---|---|
| 28-32 | 50:50 | 8-12 | 4-7 | 12:1 to 30:1 | 5-7 | 0.5 | 0.3-0.4 | Gelled |

Comparative Sample 3

Comparative concentrated dairy liquids were prepared according to the process described in Example 1, except various emulsifiers were blended into the concentrated dairy liquid either before or after retorting. The blended cream and concentrated dairy liquid in these samples were homogenized using the two-stage homogenizer of Example 1 at either 2000/200 psi or 4000/400 psi. A summary of the results and conditions for a number of comparative samples are provided in Table 8 below. All samples either gelled or were bimodal concentrates after the retort process.

TABLE 8

| Emulsifier | Emulsifier Add Point | Emulsifier, % | Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|---|---|---|
| Sodium Caseinate | Pre Retort | 0.1, 1, and 5 | 32-33 | 50:50 | 12-13 | 6-7 | 22:1 to 29:1 | 10.4 | 1 | 0.2 | Gel |
| Buttermilk | Pre Retort | 0.05 and 0.1 | 31-33 | 50:50 | 12-13 | 6-7 | 27:1 to 29:1 | 10.4 | 1 | 0.2 | Gel |
| Buttermilk | Post Retort | 0.05 and 0.1 | 31-33 | 50:50 | 12-13 | 6-7 | 27:1 to 29:1 | 10.4 | 1 | 0.2 | Fluid, bimodal |

Comparative Example 4

Comparative concentrated dairy liquids were prepared according to Comparative Example 1 where the cream was added after the homogenization of the concentrated dairy liquid. In these comparative studies, however, the cream was also blended with a variety of emulsifiers and homogenized prior to blending into the concentrated dairy liquid.

In these studies, the cream and emulsifier blend was homogenized using a single stage homogenization at about 500/50 psi prior to being added to the concentrated and homogenized dairy liquid. The emulsifiers tested were about 1 percent of either monoglyceride, polyaldos, glycosperses, or lecithin. A summary of the results and conditions for a number of comparative samples are provided in Table 9 below. All comparative samples resulted in fluid, but bimodal concentrates.

TABLE 9

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 31-33 | 50:50 | 12-13 | 6-7 | 19:1 to 25:1 | 10.4 | 1.0 | 0.2 | Fluid, bimodal |

Comparative Example 5

Comparative concentrated dairy liquids were prepared according to Example 1, except the protein to buffering salt ratio was increased or decreased over the samples of Example 1. In the studies for this Example, all samples used a 50:50 blend of MSP and DSP as stabilizers. All comparative samples in this Example resulted in gelled concentrates. A summary of the results and conditions for a number of comparative samples are provided in Table 10 below.

TABLE 10

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 30-36 | 50:50 | 12-15 | 6-8 | <10:1 | 5-7 | 0.5 | 0.3-0.4 | Gel |
| 30-36 | 50:50 | 12-15 | 6-8 | >38:1 | 5-7 | 0.5 | 0.3-0.4 | Gel |

Comparative Example 6

Comparative concentrated dairy liquids were prepared according to Example 1, except that 0.3 to 0.4 percent trisodium citrate (TSC) was used as the buffering salt. No MSP or DSP was used. All comparative samples in this Example resulted in gelled concentrates after retort. A summary of the results and conditions for a number of comparative samples are provided in Table 11 below.

TABLE 11

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 25-29 | None, used only TSC | 13-13 | 6-8 | 25:1 | 5-7 | 0.5 | 0.3-0.4 | Gel |

Comparative Example 7

Comparative concentrated dairy liquids were prepared according to Example 1, except that the pressures used to homogenize the blended cream and concentrated dairy liquid mixture were increased to about 4000/400 psi. All samples from these studies resulted in gelled concentrates after retort. A summary of the results and conditions for a number of comparative samples are provided in Table 12 below.

TABLE 12

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 30-32 | 50:50 | 8-13 | 5-8 | 12:1 to 36:1 | 10.4 | 0.96 | 0.2-0.3 | Gel |

Comparative Example 8

Comparative concentrated dairy liquids were prepared according to Example 1, except that the ratio of monosodium phosphate to disodium phosphate was altered. All samples from these studies resulted in bimodal concentrates after retort. A summary of the results and conditions for a number of comparative samples are provided in Table 13 below.

TABLE 13

| Total Solids | MSP:DSP Ratio | Fat, % | Protein, % | Protein:Total Buffering Salt | Sugar, % | NaCl, % | Buffering Salt, % | Status Post Retort |
|---|---|---|---|---|---|---|---|---|
| 30-33 | 25:75 | 12-15 | 8-9 | 20:1 and 30:1 | 5-6 | 0.4 | 0.2-0.5 | Bimodal |
| 20-33 | 8:92 and 92:8 | 11-15 | 8-9 | 25:1 | 5-6 | 0.4 | 0.2-0.5 | Bimodal |

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A method of making a stable concentrated dairy liquid, the method comprising:
   forewarming a liquid dairy base for a time and temperature sufficient to effect a reduction in pH 4.6 soluble proteins;
   concentrating the forewarmed liquid dairy base using ultrafiltration techniques to form a concentrated dairy liquid retentate;
   blending an amount of cream into the concentrated dairy liquid retentate to form a cream enriched dairy liquid;
   homogenizing the cream enriched dairy liquid to form a homogenized cream enriched dairy liquid;
   adding a stabilizer to the homogenized cream enriched dairy liquid to form a stabilized cream enriched dairy liquid;
   sterilizing the stabilized cream enriched dairy liquid at a temperature and for a time sufficient to obtain the stable concentrated dairy liquid having a $F_o$ of at least about 5, the stabilized cream enriched dairy liquid being substantially resistant to gelation during sterilization;
   the stable concentrated dairy liquid has a protein to fat ratio of about 0.4 to about 0.7 and about 1 percent or less lactose; and
   the stable concentrated dairy liquid is resistant to gelation and remains a visually stable fluid emulsion for at least about 9 months under ambient storage conditions and when reconstituted provides a fresh dairy flavor.

2. The method of claim 1, wherein the stable concentrated dairy liquid has about 20 to about 45 percent reduction in volatile compounds containing one of sulfur, nitrogen, or mixtures thereof as compared to a concentrated dairy liquid without cream enrichment.

3. The method of claim 1, wherein the stable concentrated dairy liquid has a Brew Recovery of at least about 90 percent after about 9 months of ambient storage.

4. The method of claim 1, wherein the cream has about 32 to about 42 percent fat.

5. The method of claim 1, wherein the stable concentrated dairy liquid has about 36 percent or less total solids, about 10 percent or less total protein, and about 15 percent or less total fat.

6. The method of claim 1, wherein the stable concentrated dairy liquid has a total solids of about 25 to about 36 percent, about 9 to about 15 percent fat, and about 5 to about 10 percent protein.

7. The method of claim 1, wherein a ratio of protein to total stabilizer is between about 10:1 to about 38:1.

8. The method of claim 1, wherein the liquid dairy base is whole milk.

9. The method of claim 8, wherein about 3 to about 34 percent cream is added to the concentrated dairy liquid retentate.

10. The method of claim 1, wherein about 0.3 to about 0.6 percent stabilizer is added to the homogenized cream enriched dairy liquid.

11. The method of claim 10, wherein the stabilizer includes about 25 to about 50 percent disodium phosphate and about 50 to about 75 percent monosodium phosphate.

12. The method of claim 11, wherein a ratio of monosodium phosphate to disodium phosphate is between about 1:1 to about 3:1.

13. The method of claim 1, wherein the stable concentrated dairy liquid is substantially free of emulsifiers.

14. The method of claim 1, wherein the forewarming is for a time sufficient to form a forewarmed dairy liquid having a reduced level of pH 4.6 soluble proteins by at least about 70 percent.

15. The method of claim 1, wherein the homogenization is a two-stage homogenization at about 1500 to about 2000 psi in a first stage and about 100 to about 300 psi in a second stage.

16. The method of claim 1, wherein the cream enriched dairy liquid has about 11 percent or less protein, at least about 15 percent fat, and about 1.5 percent or less lactose.

17. A stable concentrated dairy liquid comprising
a blend of ultrafiltered dairy liquid and cream;
a total solids of about 25 to about 36 percent, a protein to fat ratio of about 0.4 to about 0.7 where the fat is supplied from both the ultrafiltered dairy liquid and the cream, and less than about 1 percent lactose;
an amount of stabilizer salt in a ratio of protein to stabilizer salt between about 10:1 to about 38:1;
about 20 to about 45 percent reduction in volatile compounds containing one of sulfur, nitrogen, or mixtures thereof as compared to a concentrated dairy liquid without cream enrichment; and
a brew recovery of at least about 90 percent after about 9 months ambient storage.

18. The dairy liquid of claim 17, wherein the stable concentrated dairy liquid has about 15 percent or less fat and about 10 percent or less protein.

19. The dairy liquid of claim 17, wherein the cream has about 32 to about 42 percent fat.

20. The dairy liquid of claim 17, wherein the blend includes about 3 to about 57 percent cream.

21. The dairy liquid of claim 17, wherein the blend includes ultrafiltered whole milk and about 3 to about 34 percent cream.

22. The dairy liquid of claim 17, wherein the blend includes ultrafiltered skim milk and about 34 to about 57 percent cream.

23. The dairy liquid of claim 17, wherein the blend includes ultrafiltered two-percent milk and about 20 to about 46 percent cream.

24. The dairy liquid of claim 17, wherein the stable concentrated dairy liquid has about 10 to about 15 percent fat and about 5 to about 10 percent protein.

25. The dairy liquid of claim 17, wherein the stable concentrated dairy liquid is substantially free of emulsifiers.

26. The dairy liquid of claim 17, wherein the stabilizer salt includes a blend of monosodium phosphate and disodium phosphate in a ratio of monosodium phosphate to disodium phosphate from about 1:1 to about 3:1.

27. The dairy liquid of claim 17, wherein the cream is added to the ultrafiltered dairy liquid prior to homogenization.

\* \* \* \* \*